United States Patent
Kuo

(10) Patent No.: US 8,657,523 B2
(45) Date of Patent: Feb. 25, 2014

(54) FIXED STRUCTURE FOR FAUCETS AND BATHROOM ACCESSORIES

(75) Inventor: Chan-Long Kuo, Changhua (TW)

(73) Assignee: Guo Yuan Hardware Co., Ltd., Changhua (TW)

(*) Notice: Subject to any disclaimer, the term of this patent is extended or adjusted under 35 U.S.C. 154(b) by 185 days.

(21) Appl. No.: 13/349,537

(22) Filed: Jan. 12, 2012

(65) Prior Publication Data

US 2013/0180604 A1 Jul. 18, 2013

(51) Int. Cl.
*F16D 1/00* (2006.01)

(52) U.S. Cl.
USPC .............. 403/379.1; 403/192; 211/105.1; 248/212; 248/214

(58) Field of Classification Search
USPC .......... 137/315.12; 4/661, 678, 695; 248/212, 248/214, 216.1, 217.3, 217.4; 211/105.1, 211/123; 403/187, 192, 199, 245, 377, 378, 403/379.1
See application file for complete search history.

(56) References Cited

U.S. PATENT DOCUMENTS

| | | | | |
|---|---|---|---|---|
| 2,455,606 A * | 12/1948 | Pleiss | ............................ | 248/251 |
| 3,596,861 A * | 8/1971 | Baldini | ................... | 248/223.41 |
| 6,381,770 B1 * | 5/2002 | Raisch | .............................. | 4/570 |
| 7,111,336 B1 * | 9/2006 | Lai | .................. | 4/576.1 |
| 7,300,077 B2 * | 11/2007 | Tawara et al. | ................. | 285/417 |
| 8,382,051 B2 * | 2/2013 | Smith | ....................... | 248/221.11 |
| 2005/0263655 A1 * | 12/2005 | Bauer | ...................... | 248/223.31 |

\* cited by examiner

*Primary Examiner* — John Rivell
*Assistant Examiner* — Reinaldo Sanchez-Medina
(74) *Attorney, Agent, or Firm* — Guice Patents PLLC

(57) ABSTRACT

The present invention is related to a fixed structure for faucets and bathroom accessories, which at least includes a base and an external part, wherein the bottom side of the base is fixed on a connected body and the base has a hollow chamber in the body, at least a functional hole is set on the circumference of the body, an elastic piece is extended inwards from a part of circumference of the functional hole, a convex column is set on the end of the elastic piece; the external part has a hollow chamber set on the bottom side for placing the body of the base, and at least a slipping hole set on the circumference of the hollow chamber is provided for the convex column of the elastic piece to buckle into for positioning, to thereby achieve the purpose of quickly assembly and conveniently installing and operating.

3 Claims, 5 Drawing Sheets

FIXED STRUCTURE FOR FAUCETS AND BATHROOM ACCESSORIES

BACKGROUND OF THE INVENTION

1. Field of the Invention

The invention relates to a fixed structure for faucets and bathroom accessories and, more particularly, to the fixed structure for quickly fixing faucets and bathroom accessories, to thereby achieve the purpose of quickly assembling and conveniently installing and operating.

2. Brief Description of the Related Art

The bathroom accessories, such as faucets, towel racks, soap holders and toilet paper holders, are commonly used in the kitchens, bathrooms and other places. These external parts 12 (as shown in FIG. 1 and FIG. 2) are fixed on a connected body (such as walls and flow management units) with the connection of a base 11. Therefore, the base 11 has at least two apertures 111 for a corresponding bolt 13 passing through to fix the base 11 on the connected body (such as walls and flow management units). The external part 12 has a hollow chamber 121 on the bottom side for placing the base 11, and a lateral screw hole 122 is set on one side of the body of the external part 12. The lateral screw hole 122 is provided for a fixed bolt screwed 14 in and deeply fixed on the positioning groove 112 of the base 11, to complete the installation of the external part 12 and fix on the connected body. However, the structure has a large drawback in installation, namely, in order to ensure that there is no torsion situation occurred after connecting the external part 12 and the base 11, so the body of the base 11 is designed as a non-circular flat body, and slipping with the external part 12 with a tilt angle θ. In this way, it is not only complicated in the production process, but also increases the cost. Besides, the angle of the installation position has to be accurate, otherwise, the situation of uneven angle may be happened and the installation may be very time consuming and laborious.

SUMMARY OF THE INVENTION

In view of the drawbacks of the conventional structure, the inventor completes to develop the fixed structure for faucets and bathroom accessories of the present invention after numerous improvements, namely, the object of the invention is to provide a fixed structure for faucets and bathroom accessories, which may be conveniently assembled, installed and operated, to thereby achieve the purpose of quickly assembling and conveniently installing and operating.

To achieve the object, the fixed structure for faucets and bathroom accessories according to the present invention at least includes a base and an external part, wherein the base has a hollow chamber in the body and its bottom side is fixed on a connected body, at least a functional hole is set on the circumference of the body, an elastic piece is extended inwards from a part of circumference of the functional hole, a convex column is set on the end of the elastic piece; the external part has a hollow chamber set on the bottom side for placing the body of the base, and at least a slipping hole set on the circumference of the hollow chamber is provided for the convex column of the elastic piece to buckle into for positioning, to thereby achieve the purpose of quickly assembly and conveniently installing and operating.

The above base, at least two apertures are set on its bottom.

The above base, an outer flange is set on its bottom, and at least two apertures are set on the outer flange.

The above external part, which is a faucet body.

The above base, which is a bonding base bonded to the body of the faucet, to fix the faucet on a flow management table.

Otherwise, the embodiment of the present invention applied in bath accessories includes at least a base, a base with an extended part, and an external part, wherein:

the base, which has a hollow chamber in the body and its bottom side is fixed on a connected body, and at least a functional hole is set on the circumference of the body, an elastic piece is extended inwards from a part of circumference of the functional hole, a convex column is set on the end of the elastic piece;

the base with an extended part, which has a hollow chamber in the body and an extended part on its bottom (the extended part is a bar frame or a bathroom accessory), and at least a functional hole is set on the circumference of the body, an elastic piece is extended inwards from a part of circumference of the functional hole, a convex column is set on the end of the elastic piece;

the external part, which has a hollow chamber on its bottom side for placing the body of the base, a base with an extended part is placed in another side of the hollow chamber, and at least two slipping holes are set on the circumference of the hollow chamber, the two slipping holes respectively corresponding to the convex columns of the two elastic pieces are provided for them to buckle into.

BRIEF DESCRIPTION OF THE INVENTION

The detail structure, the applied principle, the function and the effectiveness of the present invention can be more fully understood with reference to the following description and accompanying drawings, in which.

DETAILED DESCRIPTION OF THE PREFERRED EMBODIMENTS

Figure 1:
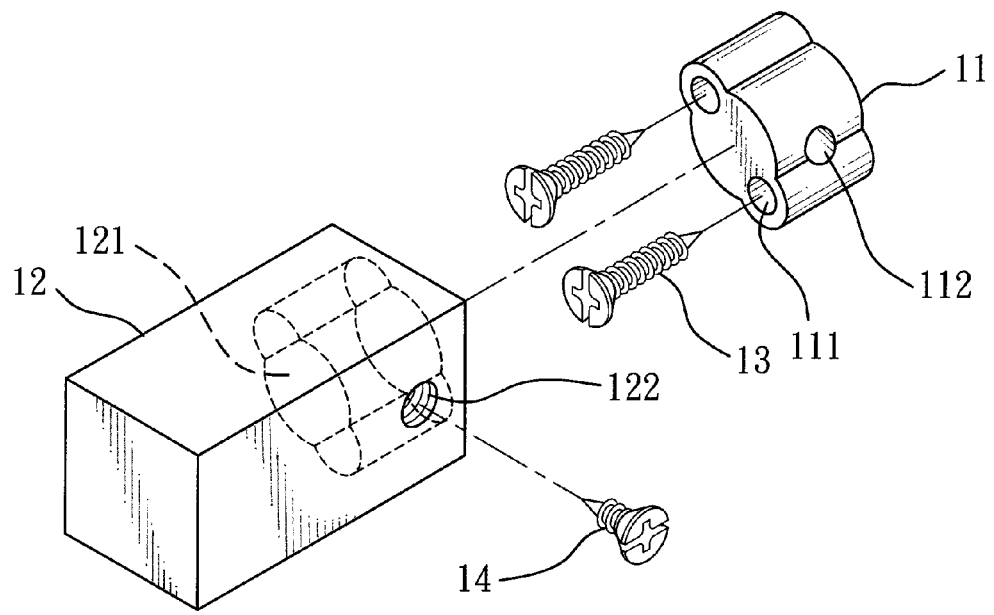
FIG. 1 is a three-dimensional exploded diagram of a conventional structure.
Figure 2:
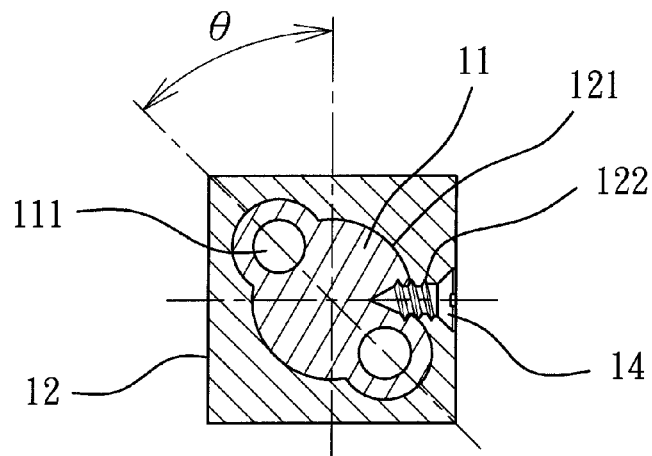
FIG. 2 is a combination diagram of a conventional structure.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

Figure 3:
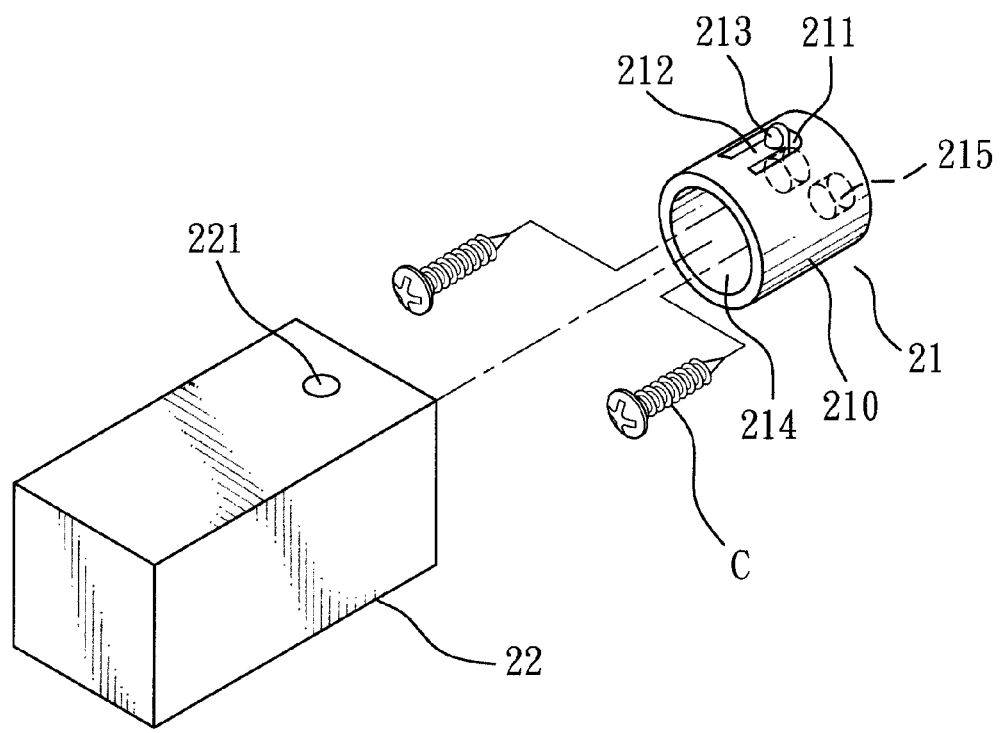
FIG. 3 is a three-dimensional exploded diagram according to the present invention.
Figure 4:
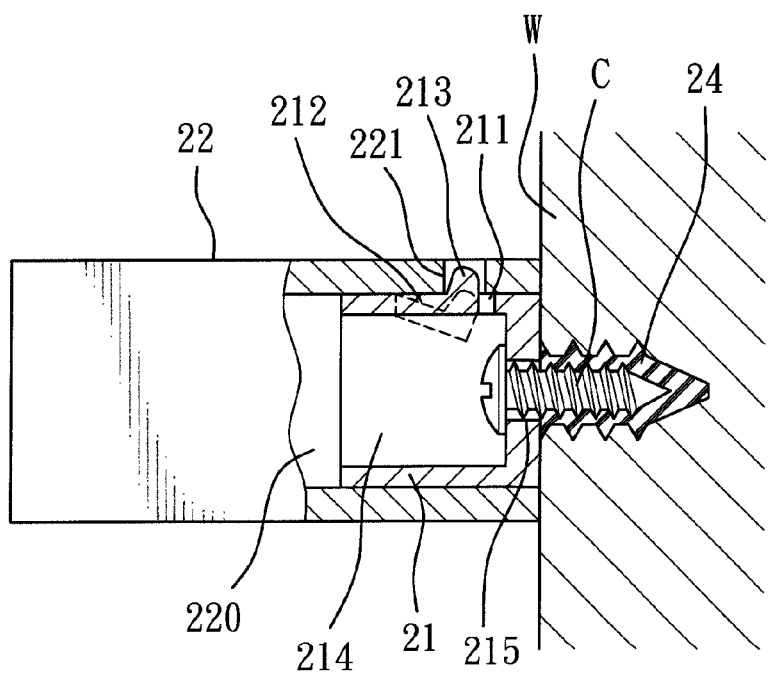
FIG. 4 is a combination cross-sectional diagram according to the present invention.

Please refer to FIG. 3 and FIG. 4, which show the fixed structure for faucets and bathroom accessories including a base 21 and an external part 22, wherein:

the base 21, the body 210 has a hollow chamber 214, at least an aperture 215 is set on its bottom for a corresponding bolt C passing through, to fixed the base 21 on the connected body W (the connected body W is a wall), and at least a functional hole 211 is set on the circumference of the body 210, an elastic piece 212 is extended inwards from a part of circumference of the functional hole 211, a convex column 213 is set on the end of the elastic piece 212;

the external part 22, which has a hollow chamber 220 on its bottom side for placing the body 210 of the base 21, and at least a slipping hole 221 is set on the circumference of the hollow chamber 220, the slipping hole 221 corresponding to the convex column 213 of the elastic piece 212 is provided for it to buckle into.

By the composition of the above structure, when installing, the bolt C may be passed through the aperture 215 of the base 21 first and locked into the functional hole 24 on the connected body W, to fix the base 21 on the connected body W, and then the hollow chamber 220 on the bottom side of the external part 22 is aligned and slipped on the base 21, since the elastic piece 212 has appropriate flexibility and may be shrank during the slipping process until the convex column 213 is buckled into the slipping hole 221, so they may be quickly bonded and positioned. When removing, a tool may be used to insert into the slipping hole 221 to force the convex column 213 shrinking away from the slipping hole 221, to quickly remove the external part 22 away from the base 21. Thus, the installing and removing process of the present invention are very convenient, easy and time-consuming.

Figure 5:
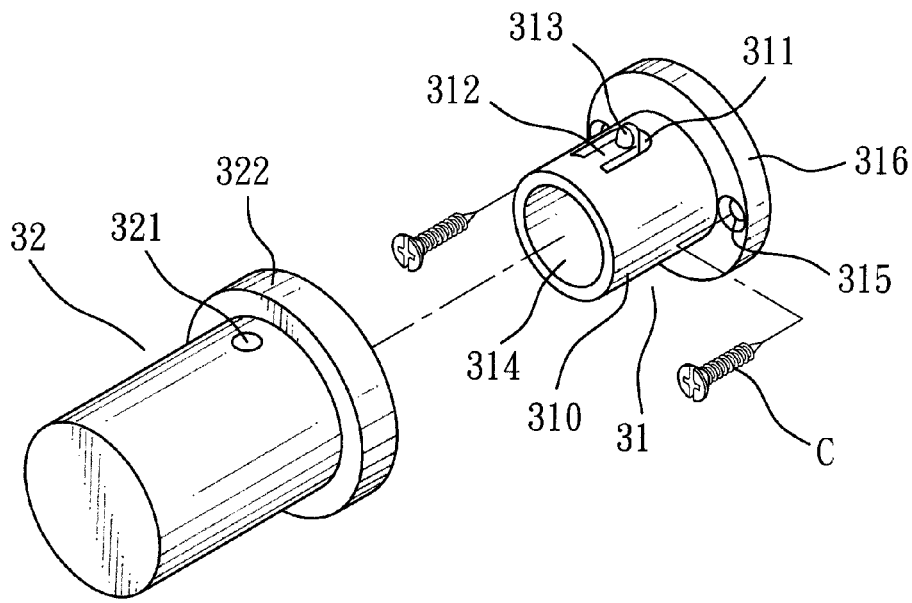
FIG. 5 is a three-dimensional exploded diagram of another embodiment according to the present invention.
Figure 6:
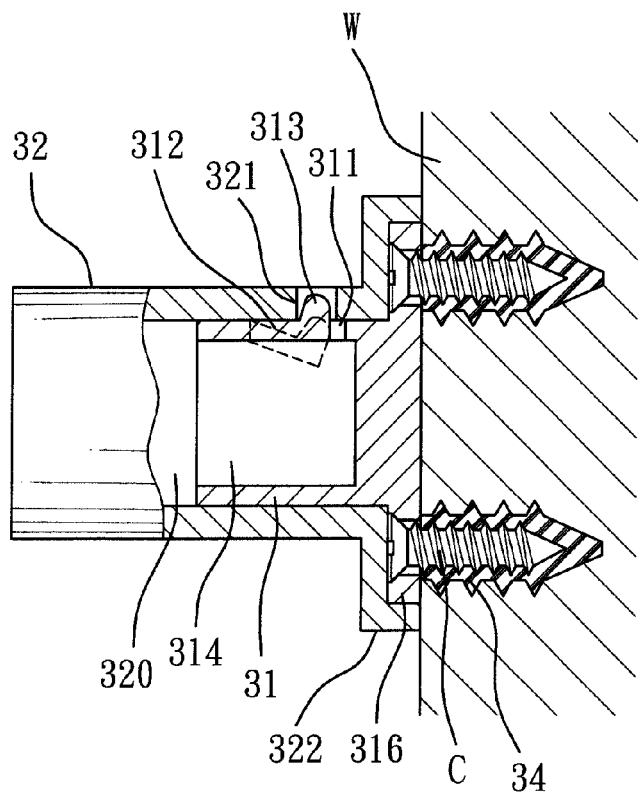
FIG. 6 is a combination cross-sectional diagram of another embodiment according to the present invention.

Another embodiment of the present invention is shown in FIG. 5 and FIG. 6, which at least includes a base 31 and an external part 32, wherein:

the base 31, which body 310 has a hollow chamber 314 with an outer flange 316 set on its bottom, at least two apertures 315 are set on the outer flange 316 for a corresponding bolt C passing through to fix the base 31 on a connected body W, and at least a functional hole 311 is set on the circumference of the body 310, an elastic piece 312 is extended inwards from a part of circumference of the functional hole 311, a convex column 313 is set on the end of the elastic piece 312;

the external part 32, which has a hollow chamber 320 on its bottom side for placing the body 310 of the base 31, and at least a slipping hole 321 is set on the circumference of the hollow chamber 320, the slipping hole 321 corresponding to the convex column 313 of the elastic piece 312 is provided for it to buckle into.

By the composition of the above structure, when installing, the bolt C may be passed through the aperture 315 of the base 31 first and locked into the functional hole 34 on the connected body W (the connected body W is a wall), to fix the base 31 on the connected body W, and then the hollow chamber 320 on the bottom side of the external part 32 is aligned and slipped on the base 31, since the elastic piece 312 has appropriate flexibility and may be shrank during the slipping process until the convex column 313 is buckled into the slipping hole 321, so that they may be quickly bonded. When removing, a tool may be used to insert into the slipping hole 321 to force the convex column 313 shrinking away from the slipping hole 321, to quickly remove the external part 32 away from the base 31. Thus, the installing and removing process are very convenient, easy and time-consuming.

Figure 7:
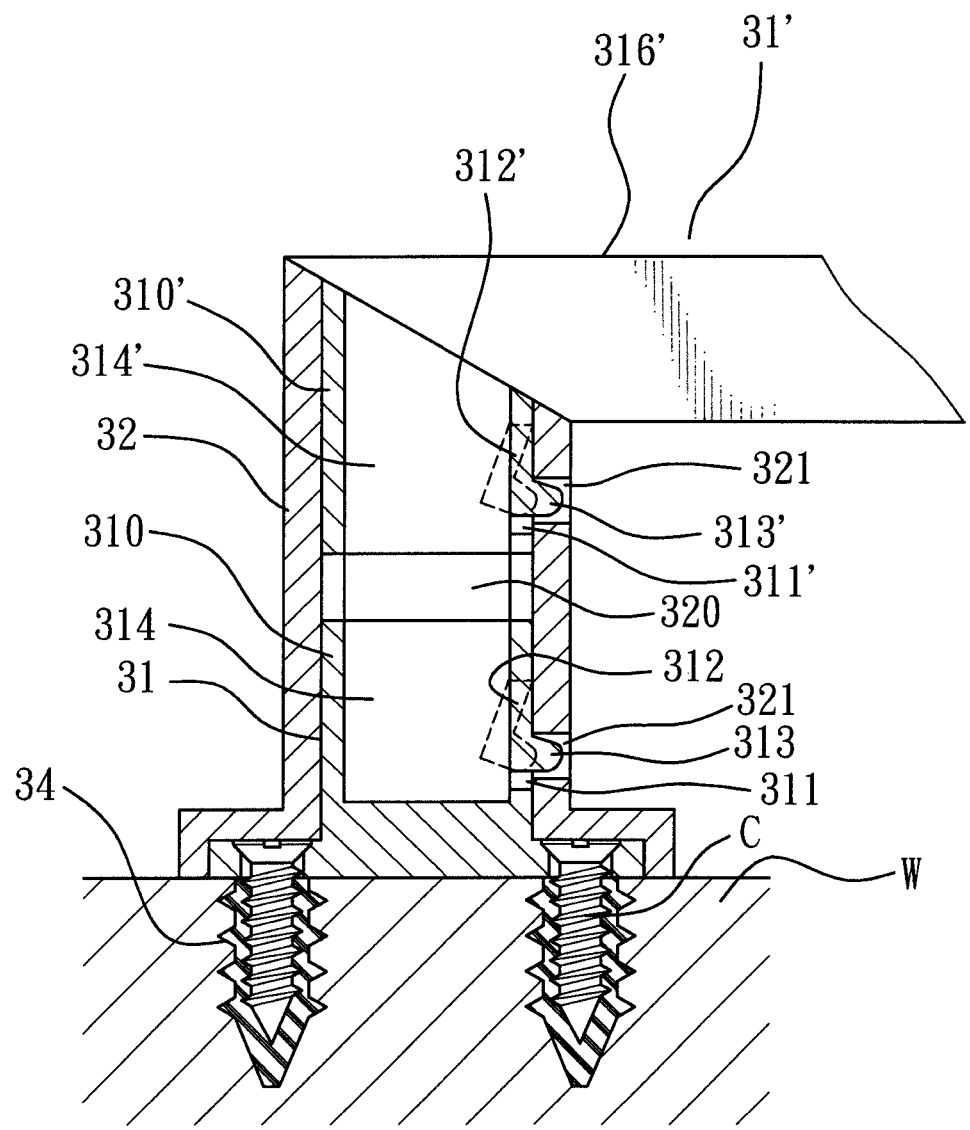
FIG. 7 is a combination cross-sectional diagram of the present invention applied in a towel rack.

As shown in FIG. 7, which is an embodiment of the above structure of the present invention applied in bathroom accessories (towel racks). In the embodiment, at least two bases are used simultaneously, namely, besides a base 31, a base 31' with an extended part is used, the present invention at least includes a base 31, a base 31' with an extended part, and an external part 32, wherein:

the base 31, which has a hollow chamber 314 in the body 310 and its bottom side is fixed on a connected body W (the connected body W is a wall), and at least a functional hole 311 is set on the circumference of the body 310, an elastic piece 312 is extended inwards from a part of circumference of the functional hole 311, a convex column 313 is set on the end of the elastic piece 312;

the base 31' with an extended part, which has a hollow chamber 314' in the body and an extended part 316' on its bottom (the extended part 316' is a bar frame or a bathroom accessory), and at least a functional hole 311 is set on the circumference of the body 310', an elastic piece 312' is extended inwards from a part of circumference of the functional hole 311', a convex column 313' is set on the end of the elastic piece 312';

the external part 32, which has a hollow chamber 320 on its bottom side for placing the body 310 of the base 31, a base with an extended part 31' is placed in another side of the hollow chamber 320, and at least two slipping holes 321 are set on the circumference of the hollow chamber 320, the two slipping holes 321 respectively corresponding to the convex column 313 of the elastic piece 312 and the convex column 313' of the elastic pieces 312' are provided for them to buckle into.

By the composition of the above structure, the fixing way is like the abovementioned embodiment, wherein the base 31 is locked on a connected body W (the connected body W is a wall) by a bolt C; one side of the external part 32 is slipped on the base 31, and another side of the external part 32 is slipped on the base 31' with the extended part, and the two slipping holes 321 set on different positions of the external part 32 are used to respectively provide the convex column 313, 313' of the two elastic pieces 312, 312' buckled into, so that a towel rack is quickly assembled and may be installed on the wall.

Figure 8:
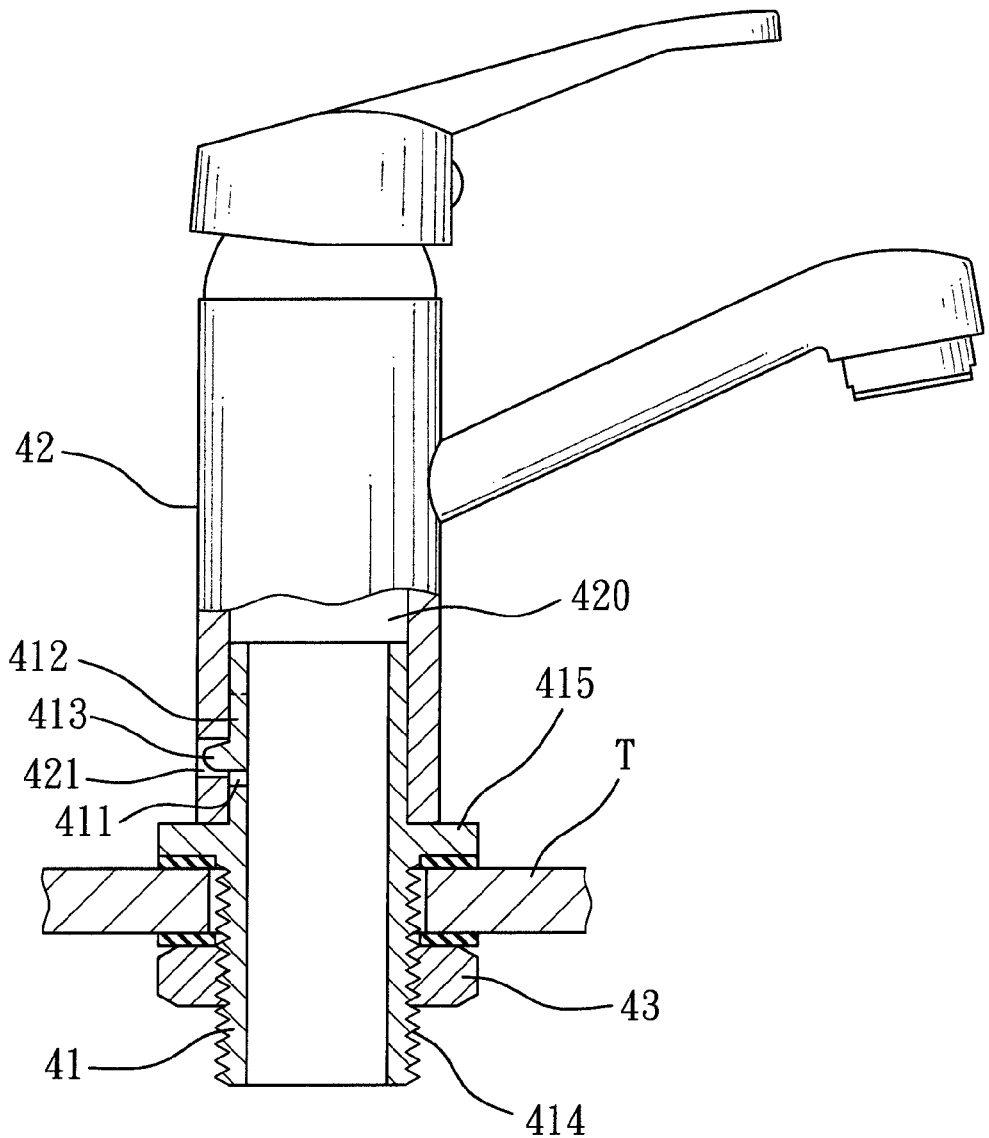
FIG. 8 is a combination cross-sectional diagram of the present invention applied in a faucet.

As shown in FIG. 8, which is an embodiment of the structure of the present invention applied in a faucet body, wherein the external part 42 is a faucet, the base 41 is a bonding base; the external part 42 has a hollow chamber 420 on its bottom side, and at least a slipping hole 421 is set on the circumference of the hollow chamber 420; at least a functional hole 411 is set on the circumference of the base 41, an elastic piece 412 is extended inwards from a part of circumference of the functional hole 411, a convex column 413 is set on the end of the elastic piece 412, the convex column 413 may be buckled into the slipping hole 412, and the base 41 has an outer flange 415 and an external thread segment 414 for being clamped by a connected body T (the connected body is a flow management unit), and a fixed nut 43 is used for fixing on the external thread segment 414, for the external part 42 quickly installing and fixing on the connected body T.

I claim:

1. A fixed structure for faucets and bathroom accessories, which includes a base, a base with an extended part, and an external part, wherein:

the base, which has a hollow chamber in a body of the base, the bottom side of the base is fixed on the body of the base, at least a functional hole is set on the circumference of the body of the base, an elastic piece is extended inwards from a part of circumference of the functional hole, a convex column is set on the end of the elastic piece;

the base with an extended part, which has a hollow chamber in a body of the base with an extended part and an extended part on its bottom, and at least a functional hole is set on the circumference of the body of the base with an extended part, an elastic piece is extended inwards from a part of circumference of the functional hole, a convex column is set on the end of the elastic piece;

the external part, which has a hollow chamber on its bottom side for placing the body of the base, the base with an extended part is placed in another side of the hollow chamber, and at least two slipping holes are set on the circumference of the hollow chamber, the two slipping holes respectively corresponding to the convex columns of the two elastic pieces are provided for the two elastic pieces to buckle into.

2. The fixed structure for faucets and bathroom accessories as claimed in claim 1, wherein at least an aperture is set on the bottom of the base.

3. The fixed structure for faucets and bathroom accessories as claimed in claim 1, wherein an outer flange is set on the bottom of the base, and at least an aperture is set on the outer flange.

\* \* \* \* \*